United States Patent
Williams et al.

(10) Patent No.: US 12,305,581 B2
(45) Date of Patent: *May 20, 2025

(54) PROPORTIONAL RESTRICTION OF A SECONDARY CIRCUIT OF A FUEL INJECTOR

(71) Applicant: Collins Engine Nozzles, Inc., Des Moines, IA (US)

(72) Inventors: Brandon P. Williams, Johnston, IA (US); Michael Ferrarotti, Durham, CT (US); Murtuza Lokhandwalla, South Windsor, CT (US); Todd Haugsjaahabink, Amherst, MA (US); Russell P. Rourke, Jr., East Granby, CT (US); Jay W. Kokas, Bloomfield, CT (US); Richard E. Versailles, New Hartford, CT (US); Jason A. Ryon, Carlisle, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,869

(22) Filed: Jul. 21, 2023

(65) Prior Publication Data
US 2024/0068413 A1 Feb. 29, 2024

Related U.S. Application Data

(63) Continuation-in-part of application No. 17/896,786, filed on Aug. 26, 2022, now Pat. No. 11,970,977.

(51) Int. Cl.
*F02C 9/26* (2006.01)
*F02C 7/22* (2006.01)
(Continued)

(52) U.S. Cl.
CPC .............. *F02C 9/263* (2013.01); *F02C 7/222* (2013.01); *F02C 7/228* (2013.01); *F02C 7/232* (2013.01); *F23R 3/28* (2013.01)

(58) Field of Classification Search
CPC .......... F02C 7/222; F02C 7/228; F02C 7/232; F02C 9/263; F23R 3/28
See application file for complete search history.

(56) References Cited

U.S. PATENT DOCUMENTS

| 3,728,859 | A |   | 4/1973 | Seiler |           |
|-----------|---|---|--------|--------|-----------|
| 4,649,950 | A | * | 3/1987 | Bradley | B01D 35/04 |
|           |   |   |        |         | 239/113   |

(Continued)

OTHER PUBLICATIONS

European Seach Report issued in European Patent App. No. 23193474.6—dated Jan. 30, 2024.

*Primary Examiner* — William H Rodriguez
(74) *Attorney, Agent, or Firm* — Kinney & Lange, P.A.

(57) ABSTRACT

A fuel injector for a turbine engine includes a fuel scheduling valve configured for regulation of fuel flow from a fuel inlet, in response to fuel pressure received at the fuel inlet. Primary, secondary and auxiliary fuel circuits receive fuel from the scheduling valve, and an electrically-controlled valve is provided in fluid communication with the auxiliary circuit, which electrically-controlled valve is adapted and configured to actively control fuel through the auxiliary circuit in response to a control signal. The auxiliary fuel circuit joins with the secondary fuel circuit for delivery to a fuel nozzle.

20 Claims, 5 Drawing Sheets

(51) Int. Cl.
*F02C 7/228* (2006.01)
*F02C 7/232* (2006.01)
*F23R 3/28* (2006.01)

(56) References Cited

U.S. PATENT DOCUMENTS

| | | | |
|---|---|---|---|
| 4,655,912 | A | 4/1987 | Bradley et al. |
| 4,726,396 | A | 2/1988 | Bradley et al. |
| 4,817,389 | A | 4/1989 | Holladay et al. |
| 4,938,418 | A * | 7/1990 | Halvorsen ............... F23N 1/007 |
| | | | 239/584 |
| 4,962,887 | A | 10/1990 | Matsuoka |
| 5,257,502 | A | 11/1993 | Napoli |
| 5,339,636 | A | 8/1994 | Donnelly et al. |
| 5,417,054 | A | 5/1995 | Lee et al. |
| 5,701,732 | A * | 12/1997 | Nesbitt ................... F23R 3/343 |
| | | | 60/776 |
| 5,732,730 | A | 3/1998 | Shoemaker et al. |
| 5,735,117 | A * | 4/1998 | Toelle ..................... F02C 7/232 |
| | | | 60/740 |
| 6,003,781 | A | 12/1999 | Kwan |
| 6,119,960 | A | 9/2000 | Graves |
| 6,314,717 | B1 | 11/2001 | Teets et al. |
| 6,351,948 | B1 | 3/2002 | Goeddeke |
| 6,357,237 | B1 | 3/2002 | Candy et al. |
| 7,255,290 | B2 | 8/2007 | Bright et al. |
| 8,316,630 | B2 | 11/2012 | Futa et al. |
| 8,347,599 | B2 | 1/2013 | Scully |
| 8,387,400 | B2 | 3/2013 | Goeke et al. |
| 8,438,851 | B1 | 5/2013 | Uhm et al. |
| 8,483,931 | B2 | 7/2013 | Williams et al. |
| 8,666,632 | B2 | 3/2014 | Zebrowski et al. |
| 8,677,754 | B2 | 3/2014 | Lueck et al. |
| 8,807,463 | B1 | 8/2014 | McAlister |
| 8,820,087 | B2 | 9/2014 | Ryan |
| 9,121,349 | B2 | 9/2015 | Griffiths et al. |
| 9,234,465 | B2 | 1/2016 | Futa et al. |
| 9,488,107 | B2 | 11/2016 | Rodrigues et al. |
| 9,494,079 | B2 | 11/2016 | Pousseo et al. |
| 9,840,992 | B2 | 12/2017 | Duncan et al. |
| 10,041,411 | B2 * | 8/2018 | Chabaille ................. F02C 7/22 |
| 10,174,948 | B2 | 1/2019 | Hill |
| 10,288,294 | B2 | 5/2019 | Griffiths et al. |
| 10,408,131 | B2 | 9/2019 | Thompson et al. |
| 10,465,908 | B2 | 11/2019 | Stevenson et al. |
| 10,487,957 | B2 | 11/2019 | Bleeker et al. |
| 10,502,138 | B2 | 12/2019 | Reuter et al. |
| 10,982,858 | B2 | 4/2021 | Bickley |
| 11,053,862 | B2 * | 7/2021 | Ryon ....................... F23R 3/38 |
| 11,067,278 | B2 | 7/2021 | Prociw et al. |
| 11,098,648 | B2 * | 8/2021 | Chabaille ................. F23K 5/147 |
| 11,215,121 | B2 | 1/2022 | Stevenson |
| 11,371,439 | B2 | 6/2022 | Di Martino et al. |
| 11,408,347 | B2 | 8/2022 | Reuter et al. |
| 11,408,348 | B2 | 8/2022 | Culwick |
| 11,421,600 | B1 | 8/2022 | Reuter et al. |
| 11,549,687 | B2 | 1/2023 | Griffiths et al. |
| 11,643,970 | B2 | 5/2023 | Baker et al. |
| 11,913,381 | B1 * | 2/2024 | Williams ................. F16K 31/04 |
| 11,913,382 | B1 * | 2/2024 | Williams ................. F02C 9/263 |
| 11,970,976 | B2 * | 4/2024 | Lokhandwalla .......... F23R 3/36 |
| 11,970,977 | B2 * | 4/2024 | Lokhandwalla ........ F23R 3/346 |
| 2002/0000737 | A1 | 6/2002 | Lavie et al. |
| 2003/0093998 | A1 | 5/2003 | Michau et al. |
| 2005/0021726 | A1 | 10/2005 | Myers et al. |
| 2005/0217269 | A1 | 10/2005 | Myers et al. |
| 2005/0224598 | A1 | 10/2005 | Potz et al. |
| 2006/0144964 | A1 | 7/2006 | Boecking |
| 2006/0236974 | A1 | 10/2006 | Randall |
| 2009/0077945 | A1 * | 3/2009 | Cornwell .................. F23R 3/28 |
| | | | 60/39.281 |
| 2009/0173810 | A1 | 7/2009 | Rodrigues et al. |
| 2009/0204306 | A1 | 8/2009 | Goeke et al. |
| 2009/0002345 | A1 | 9/2009 | Williams et al. |
| 2009/0234555 | A1 * | 9/2009 | Williams ................. F23R 3/343 |
| | | | 701/100 |
| 2009/0277185 | A1 * | 11/2009 | Goeke ..................... F02C 9/263 |
| | | | 60/776 |
| 2010/0005776 | A1 | 1/2010 | Lueck et al. |
| 2010/0037615 | A1 | 2/2010 | Williams et al. |
| 2010/0050593 | A1 | 3/2010 | Futa et al. |
| 2010/0058770 | A1 | 3/2010 | Ryan |
| 2012/0001599 | A1 | 6/2012 | Griffiths et al. |
| 2012/0015995 | A1 | 6/2012 | Griffiths et al. |
| 2012/0159953 | A1 | 6/2012 | Griffiths et al. |
| 2012/0026066 | A1 | 10/2012 | Pidcock |
| 2012/0260663 | A1 * | 10/2012 | Pidcock ................... F02C 7/222 |
| | | | 60/740 |
| 2012/0261000 | A1 | 10/2012 | Futa et al. |
| 2013/0004333 | A1 | 2/2013 | Snodgrass et al. |
| 2013/0042920 | A1 | 2/2013 | Snodgrass et al. |
| 2013/0043331 | A1 | 2/2013 | Snodgrass et al. |
| 2013/0061599 | A1 | 3/2013 | Van Alen |
| 2014/0034023 | A1 | 2/2014 | Coldren |
| 2014/0311455 | A1 | 10/2014 | Kim et al. |
| 2015/0096301 | A1 | 4/2015 | Chabaille et al. |
| 2015/0292412 | A1 | 10/2015 | Rodrigues et al. |
| 2016/0017808 | A1 | 1/2016 | Chabaille et al. |
| 2016/0002455 | A1 | 8/2016 | Hill |
| 2016/0230904 | A1 | 8/2016 | Zarrabi et al. |
| 2016/0298851 | A1 | 10/2016 | Brickwood et al. |
| 2017/0268781 | A1 | 9/2017 | Stevenson et al. |
| 2018/0066588 | A1 | 3/2018 | Daly et al. |
| 2018/0163635 | A1 | 6/2018 | Marocchini et al. |
| 2018/0163637 | A1 | 6/2018 | Griffiths |
| 2018/0163966 | A1 | 6/2018 | Jones et al. |
| 2018/0291831 | A1 | 10/2018 | Hirano |
| 2018/0003723 | A1 | 12/2018 | Yates et al. |
| 2018/0372321 | A1 | 12/2018 | Yates et al. |
| 2018/0372323 | A1 | 12/2018 | Griffiths |
| 2021/0000181 | A1 | 1/2021 | Griffiths et al. |
| 2021/0017908 | A1 | 1/2021 | Di Martino et al. |
| 2021/0018177 | A1 | 1/2021 | Griffiths et al. |
| 2023/0050741 | A1 | 2/2023 | Xuening et al. |
| 2024/0068401 | A1 * | 2/2024 | Lokhandwalla .......... F23R 3/36 |
| 2024/0068407 | A1 * | 2/2024 | Williams ................. F02C 7/228 |
| 2024/0068412 | A1 * | 2/2024 | Williams ................. F02C 7/232 |

\* cited by examiner

PROPORTIONAL RESTRICTION OF A SECONDARY CIRCUIT OF A FUEL INJECTOR

CROSS-REFERENCE TO RELATED APPLICATIONS

This is a continuation-in-part of U.S. patent application Ser. No. 17/896,786 filed Aug. 26, 2022, the content of which is incorporated herein in its entirety.

BACKGROUND

Field of the Invention

The present invention relates to fuel control and delivery systems of turbine engines, particularly to fuel injectors and nozzles, such as those found in commercial aircraft.

Description of the Related Art

Turbine fuel control systems, such as those typically found in commercial aircraft include various robust controls to allow for optimized operational characteristics under different load conditions.

Often, a mechanical fuel metering or "scheduling" valve is provided in connection with a fuel injector and serves to respond to an increase in fuel pressure supplied to it by gradually opening one or more flow paths, such as to a primary and/or secondary fuel injector nozzle. A resistive spring provides the force balance to limit the rate at which the scheduling valve opens. These valves can be used to divide flow as well, providing multiple flow paths that can be sequenced/scheduled based on inlet fuel pressure, valve open area, and any downstream flow devices such as atomizers. At relatively low flow conditions, the flow scheduling valve is largely responsible for most of the metering and therefore consumes/requires the majority of the fuel pressure. At relatively high flow conditions, there is a transition of pressure drop from the valve to other components downstream of the valve. One such fuel scheduling valve is described in U.S. Pat. No. 5,732,730 to Shoemaker, et al., which reference is incorporated herein by reference in its entirety.

Gas turbine combustors will typically have a natural frequency that may become excited when a certain heat release is attained. Quite often this phenomenon occurs at ground conditions, however, it can also be a concern under multiple flow conditions. This condition can cause significant levels of noise and occasionally may negatively impact the health of the structural components within and around the combustor. To mitigate this noise, adjustments to fuel scheduling may be directed, in an attempt to decouple the heat release and noise, however, these attempts require additional flow dividing hardware and fuel manifolds, adding significant cost, weight, and power requirements.

Alternative fuel distribution systems also exist in the art that include a common fuel dividing valve, which distributes supplied fuel to separate manifolds, each manifold independently delivering a supply of fuel to separate fuel circuits of multiple injectors.

Although generally considered satisfactory, such aforementioned arrangements do not allow for active or granular control of injectors, which can lead to suboptimal performance and/or undesirable operational characteristics under certain operating conditions. Applicant recognizes, therefore, an ever present need for improved systems and methods for adjusting flow in passive injection valves.

SUMMARY

In accordance with a first aspect of the invention, a fuel injector for a turbine engine includes a housing having an internal enclosure for pressurized fluid, a fuel inlet formed on the housing, permitting delivery of a fuel supply to the fuel injector, a scheduling valve disposed within the housing, configured for regulation of fuel flow from the fuel inlet in response to fuel pressure received at the fuel inlet, a primary fuel circuit formed in the housing, receiving fuel from the scheduling valve, a secondary fuel circuit formed in the housing, receiving fuel from the scheduling valve, an auxiliary fuel circuit formed in the housing, receiving fuel from the scheduling valve, an electrically-controlled valve in fluid communication with the auxiliary fuel circuit, adapted and configured to actively control fuel through the auxiliary fuel circuit in response to a control signal, a fuel nozzle in fluid communication with and receiving fuel from the primary and secondary and auxiliary fuel circuits; a primary outlet formed on the nozzle, in fluid communication with the primary fuel circuit, and a secondary outlet formed on the nozzle, in fluid communication with the secondary fuel circuit and the auxiliary fuel circuit.

The electrically-controlled valve is a discrete open/closed valve. It is also contemplated that the electrically-controlled valve can be a proportional valve with intermediate conditions between fully open and fully closed. The proportional valve can include a proportional solenoid, a stepper motor, or a torque motor based servo valve with flapper and nozzle.

The scheduling valve can further include a valve spool, biased to a closed position by one or more biasing members, wherein the valve spool is configured to regulate flow from the inlet of the injector to each of the primary, secondary and auxiliary fuel circuits, wherein the valve spool includes a scheduling surface configured to vary flow area through the secondary circuit based on position of the valve spool within the scheduling valve, and wherein the valve spool includes a scheduling surface configured to vary flow area through the auxiliary circuit based on position of the valve spool within the scheduling valve.

Depending on the implementation, the auxiliary fuel circuit can branch off of the primary fuel circuit. Alternatively, the auxiliary fuel circuit can be an independent fuel circuit downstream from the scheduling valve.

In accordance with the invention, activation of the electrically-controlled valve can control fuel flow rate through the auxiliary fuel circuit. The electrically-controlled valve can be a binary valve. Alternatively, the electrically-controlled valve can be a modulating valve. Further, the electrically-controlled valve can be a motorized valve.

In accordance with a further aspect of the invention, a fuel supply system for a turbine engine is provided, and includes a single fuel manifold adapted to receive and distribute a fuel supply to a plurality of points of the turbine engine, and a plurality of fuel injectors distributed around a periphery of the engine, adapted and configured to receive fuel from the single fuel manifold. In accordance with this aspect, at least one of the fuel injectors has a housing having an internal enclosure for pressurized fluid, a fuel inlet formed on the housing, permitting delivery of fuel supply from the single fuel manifold to the fuel injector, a scheduling valve disposed within the housing, configured for regulation of fuel flow from the fuel inlet in response to fuel pressure received at the fuel inlet, a primary fuel circuit formed in the housing, receiving fuel from the scheduling valve, a secondary fuel circuit formed in the housing, receiving fuel from the scheduling valve, an auxiliary fuel circuit formed in the housing, receiving fuel from the scheduling valve, an electrically-controlled valve in fluid communication with the auxiliary fuel circuit adapted and configured to actively control fuel through the auxiliary fuel circuit in response to a control signal, a fuel nozzle in fluid communication with and receiving fuel from the primary, secondary and auxiliary fuel circuits, a primary outlet formed on the nozzle, in fluid communication with the primary fuel circuit, and a secondary outlet formed on the nozzle, in fluid communication with the secondary fuel circuit and the auxiliary fuel circuit.

The electrically-controlled valve is a discrete open/closed valve. It is also contemplated that the electrically-controlled valve can be a proportional valve with intermediate conditions between fully open and fully closed. The proportional valve can include a proportional solenoid or a stepper motor.

In accordance with the invention, the system can further include at least one passive fuel injector, receiving fuel from the single fuel manifold. The at least one passive fuel injector can include only one nozzle. Alternatively or additionally, the at least one passive fuel injector can be a duplex fuel injector.

The system can further include a metering valve adapted and configured to receive a fuel supply from a fuel pump, and output the fuel to the single manifold.

Moreover, a controller can be provided and electrically connected to the electrically-controlled valve on at least one fuel injector for individual control thereof. Alternatively, the controller can be electrically connected to each of the electrically-controlled valves of a plurality of fuel injectors for ganged control thereof. Each of the injectors in the plurality of fuel injectors can include a mass flow sensor operatively connected to the controller to provide mass flow feedback to the controller.

These and other features of the devices, systems and related methods of the subject disclosure will become more readily apparent to those skilled in the art, from the following detailed description of the preferred embodiments taken in conjunction with the drawings.

BRIEF DESCRIPTION OF THE DRAWINGS

So that those skilled in the art to which the subject disclosure appertains will readily understand how to make and use the devices, systems and related methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
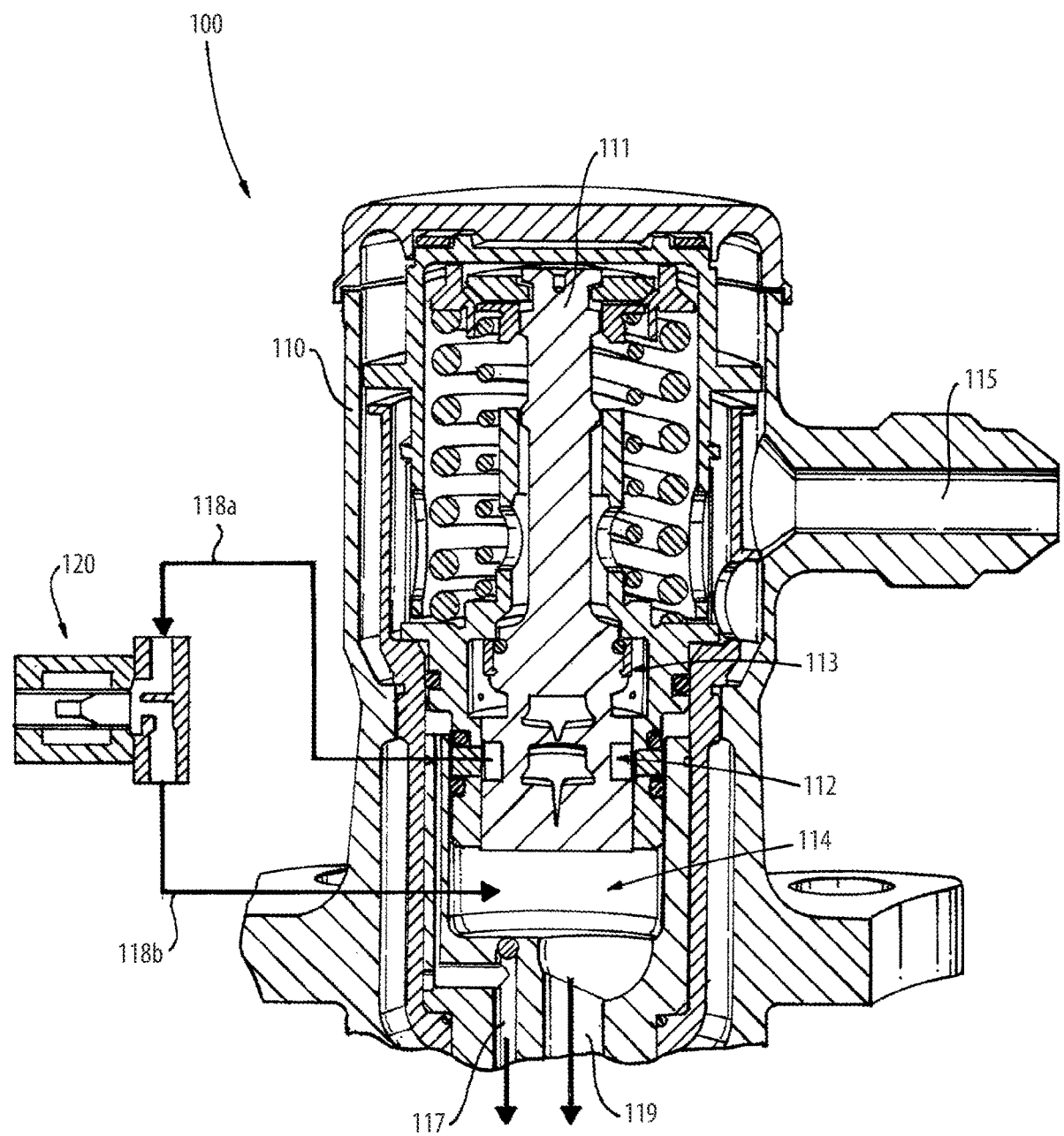
FIG. 1 is a schematic cross-sectional perspective view of a first embodiment of a valve arrangement for a fuel injector in accordance the present invention.

Reference will now be made to the drawings wherein like reference numerals identify similar structural features or aspects of the subject disclosure. For the purposes of explanation and illustration, and not limitation, representative embodiments and aspects of the subject devices, systems and related methods are described. The devices, systems and methods described herein can be used to provide adjustment to fuel flow through otherwise passive valves, e.g. to mitigate acoustics, emissions or flame-out conditions, or to otherwise provide active patternation in fuel injection for gas turbine engines.

With reference to FIG. 1, there is illustrated a schematic cross-sectional perspective view of a valve arrangement 100 for a fuel injector in accordance with one aspect of the present invention. The valve 100 includes a housing 110, a fuel inlet 115, and a movable valve member or spool 111, which is fitted inside the housing 110, and resiliently urged into a normally closed position, unless acted on by sufficient inlet fuel pressure to overcome the biasing force(s). When experiencing increased fuel pressure of a predetermined value, the spool 111 is urged downward, allowing fuel to pass into a primary fuel outlet chamber 113. Fuel is thus supplied to a primary fuel circuit 117.

Depending on the implementation, the spool 111 can be configured to, at the same time, begin permitting fuel to enter auxiliary fuel outlet chamber 112. Alternatively, the spool 111 can be configured so that this occurs in response to a further fuel pressure increase. Thus, fuel is supplied to an auxiliary fuel circuit 118.

An electrically-controlled valve 120 is provided in the auxiliary fuel circuit 118, with a first portion 118a thereof leading from the auxiliary fuel outlet chamber 112 to the electrically-controlled valve 120, and a second portion 118b leading from the electrically-controlled valve 120 and to the secondary fuel circuit 119. In the illustrated embodiment, the auxiliary fuel circuit 118 joins the secondary fuel circuit 119 at the secondary fuel outlet chamber 114, however alternative points of interconnection are possible. The electrically-controlled valve 120 enables active adjustment of fuel flowing through the auxiliary fuel circuit 118, and thereby enables active adjustment of fuel flowing through the secondary fuel circuit 119. Depending on the configuration of the spool 111, fuel may not otherwise be flowing through the secondary fuel circuit 119 based on the position of the valve spool 111, but still available to the auxiliary fuel circuit 118, in which case fuel can be supplied to the fuel injector by way of the secondary fuel circuit 119, as commanded by the electrically-controlled valve 120. Moreover, depending on the implementation, the electrically-controlled valve 120 can be formed integrally with the housing 110, or formed separately, attached thereto.

If higher fuel pressure is applied via fuel inlet 115, such as when higher power output is required, the spool 111 is urged further downward, opening a path for fuel to enter the secondary fuel outlet chamber 114 directly, and thus also the secondary fuel circuit 119. The primary fuel circuit 117 and secondary fuel circuit 119 continue to deliver fuel to respective primary and secondary fuel nozzles of an associated fuel injector in a predetermined rate corresponding to fuel pressure increases. Meanwhile, the auxiliary fuel circuit 118 can deliver additional fuel to the secondary fuel circuit at the command of the electrically-controlled valve 120.

In alternate implementations, the same valve arrangement 100 can be used in conjunction with multiple injectors simultaneously. That is, instead of providing a valve arrangement 100 on each individual injectors, it may be advantageous, depending on the implementation, to distribute the fuel from each of the primary 117, secondary 119 (including auxiliary 118) fuel channels to groups of multiple fuel injectors and their respective nozzles.

As such, the valve arrangement 100, including the electrically-controlled valve 120 on the auxiliary fuel circuit, permits active control of fuel flow rate through the secondary fuel circuit 119, in addition to the regular fuel pressure-based flow schedule through the secondary fuel circuit 119, as would be determined by the purely mechanical components of the valve 100—namely the spool 111. As mentioned above, depending on the position of the spool 111, the electrically-controlled valve 120 may contribute all of the fuel passing through the secondary fuel circuit 119, or simply augmenting the fuel already flowing through the second fuel circuit 119. Such control may be desirable in order to change the characteristics of the fuel being injected into the combustor of the turbine engine in order to control acoustics, emissions, or mitigate the potential for flame-out, for example.

Advantageously, because active control is only provided for a portion of fuel flow, a smaller valve operator is needed than would be required for full electric fuel control. Also for this reason and because use of active control will typically be limited to certain operating conditions, any additional electrical power requirements are also minimized, along with associated heat generation.

The electrically-controlled valve 120 can be of any suitable type, as may be dictated by the desired implementation. Suitable valves can be of solenoid-operated type, or those utilizing electroactive (e.g. piezoelectric) materials, such as those described by U.S. Patent Publication No. 2016/0230904 to Zarrabi et al., which is incorporated herein by reference, in its entirety. Alternatively, proportional or modulating operators can be utilized, such as by use of a stepper-motor actuator, as well as 3-way solenoid valves, magnetorestrictive valves, or a torque motor based servo valve with flapper and nozzle.

Figure 2:
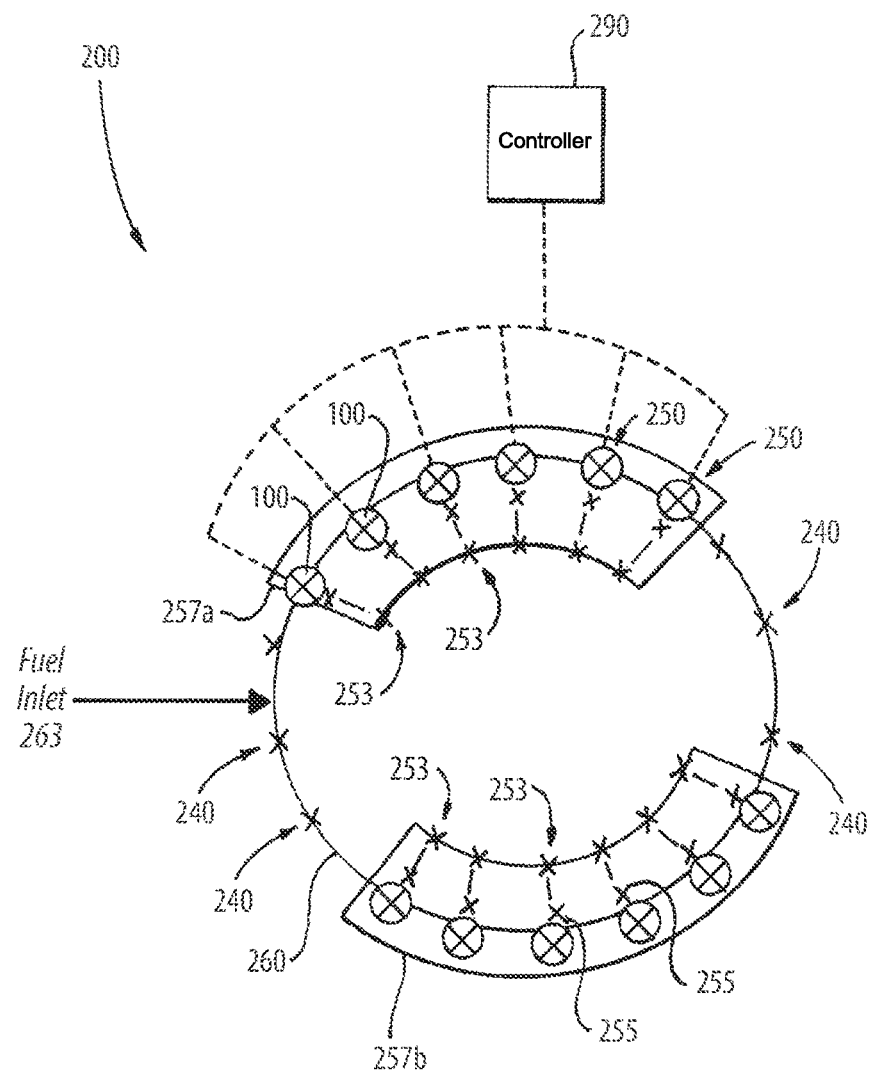
FIG. 2 is a schematic diagram of a fuel supply system for a jet turbine engine in accordance with a further aspect of the invention, which includes multiple fuel injectors incorporating the valve arrangement of FIG. 1, along with duplex fuel nozzles.

With reference now to FIG. 2, there is illustrated a fuel supply system 200, which includes a plurality of duplex injectors 250, each with a valve arrangement 100 as shown in FIG. 1. Each duplex injector 250 includes a primary nozzle 253 and a secondary nozzle 255, respectively fed by primary 117, and secondary 119 fuel circuits of the injector, as described above.

The illustrated embodiment also includes a plurality of simplex fuel injectors 240, configured so as to act as secondary nozzles, passively—that is, to become active with other secondary nozzles 255 of the system 200 in response to increased fuel pressure above a predetermined level. The duplex 250 and simplex 240 injectors are connected by way of a single fuel manifold 260, which receives fuel via inlet 263, optionally from a common fuel metering valve. Alternatively, also in accordance with the invention, and as will be appreciated by those skilled in the art, different combinations of valve types can be combined, such as duplex injectors in place of simplex injectors 240. Moreover, such duplex injectors can be of a purely passive design, as discussed above, depending on the desired implementation.

A controller 290 is also illustrated interfacing with respective valves 100, in order to actively adjust fuel flow, as described above. For the sake of simplicity, electrical connections are only illustrated for a portion of the duplex injectors 250 having electrically-controlled valves 120. The controller can be configured so as to enable individual control of each electrically-controlled valve 120, or alternatively, can be configured so as to control them in predetermined groupings or in "ganged" fashion.

As illustrated, a first sub-set of duplex injectors 257a is grouped circumferentially offset from the second sub-set of duplex injectors 257b. In the illustrated embodiment there are also two groups of three passive simplex injectors 240, also separated circumferentially from one another. Those skilled in the art will readily appreciate that this circumferential arrangement can be modified, and the number of valves can be modified, as needed for a given engine application, and that control of the injectors 240, 250 as described herein allows for finely tuned control of the flame in an associated combustor.

Further, the control of electrically-controlled valves 120 can be based on sensor feedback from one or more sensors in the system 200, such as mass flow sensors, pressure sensors and/or valve position sensors, which can allow for health monitoring and active flow control. Moreover, of the actively controlled valves, the controller 290 can control certain valves to have higher flow rates than others. That is, if one valve 120 is set to reduce flow, other valves 120 can be set to increase flow to compensate. Such active balancing can prove effective in the dynamics of a turbine combustion chamber.

With regard to operation, when valves are actuated to increase or reduce fuel flow rates, the valves can be actuated gradually and/or sequentially to minimize sudden pressure fluctuations within the fuel system 200.

There are various potential benefits of the devices, systems and methods disclosed herein, as follows. Among the benefits are that failure modes of the electrically-controlled valves 120 add little if any additional risk for operation of the injectors—in the unlikely event of a component failure, the affected injector would revert to standard mechanical operation. Further, devices, systems and methods as disclosed herein allow for removal of the engine flow divider valve and associated fuel manifolds, fittings, and the like, and allow primary, secondary and auxiliary circuits to be supplied by a single manifold while still providing active control.

Figure 3:
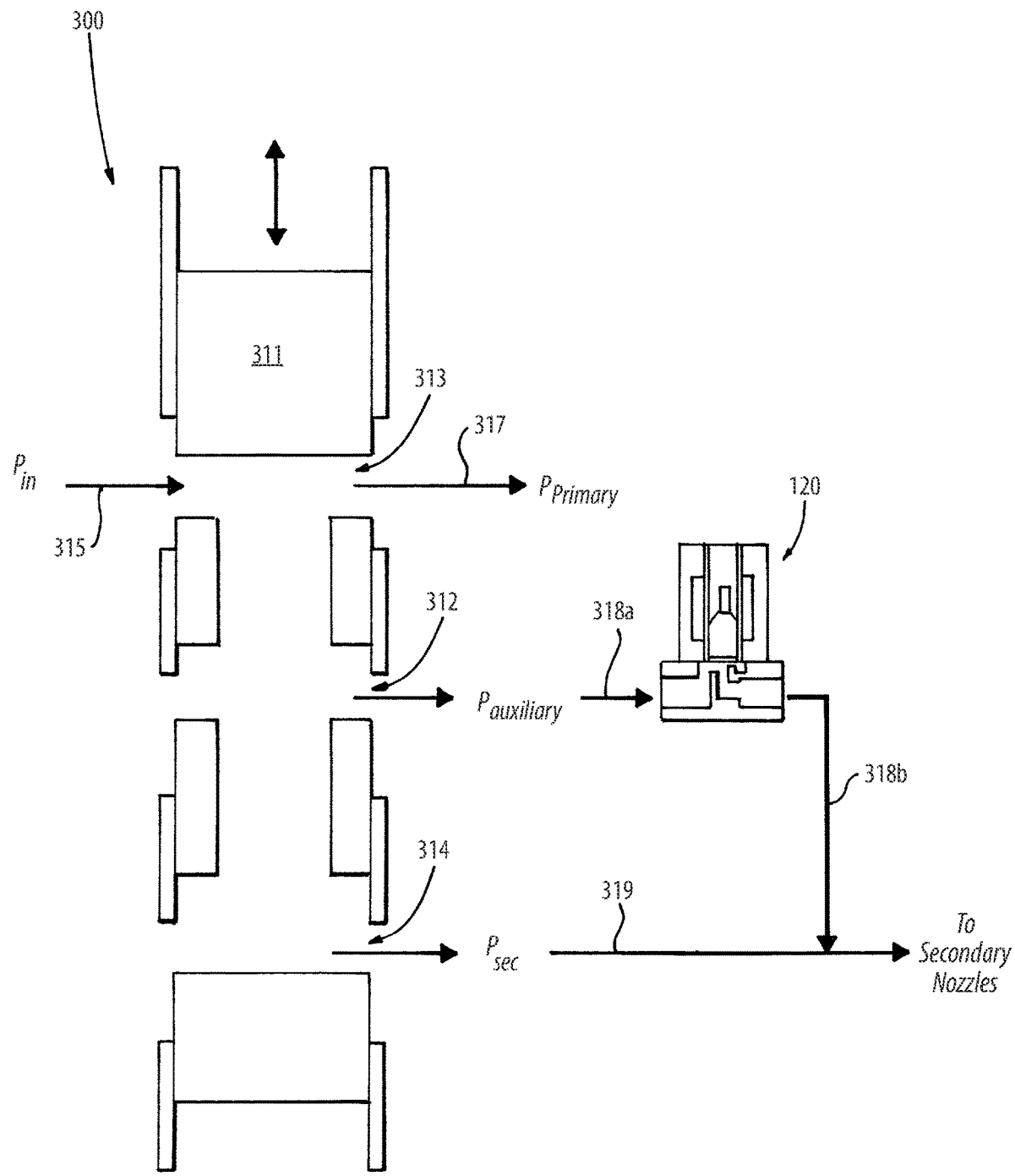
FIG. 3 is a schematic cross-sectional view of an alternate embodiment of a valve arrangement for a fuel injector in accordance with the present invention.

With reference now to FIG. 3, there is illustrated a schematic cross-sectional view of a second embodiment of a valve arrangement 300 for a fuel injector in accordance with an additional aspect of the present invention. In short, the function of the valve 300 is similar to that of valve 100 of FIG. 1, in which the auxiliary fuel circuit 318 is mechanically controlled by the configuration of the valve spool 311.

The valve 300 includes a housing (not illustrated), a fuel inlet 315, and a movable valve member or spool 311, which is fitted inside the housing, and resiliently urged into a normally closed position, unless acted on by sufficient inlet fuel pressure to overcome the biasing force(s). When experiencing increased fuel pressure of a predetermined value, the spool 311 is urged downward, allowing fuel to pass into a primary outlet chamber 313. Fuel is thus supplied to a primary fuel circuit 317.

Depending on the configuration of the spool 311, fuel is supplied to an auxiliary fuel circuit 318 leading from an auxiliary outlet chamber 312 at a prescribed range in the position of the spool 311, which can be selected as required by the precise implementation.

If higher fuel pressure is applied via fuel inlet 315, such as when higher power output is required, the spool 311 is urged further downward, opening a path for fuel to enter a secondary fuel outlet chamber 314, and thus also a secondary fuel circuit 319. The primary fuel circuit 317 and secondary fuel circuit 319 continue to deliver fuel to respective primary and secondary fuel nozzles of an associated fuel injector, while the auxiliary fuel circuit 318 delivers fuel at the command of the electrically-controlled valve 120 by way of the secondary fuel circuit 319.

The electrically-controlled valve 120 is provided in the auxiliary fuel circuit 318, with a first portion 318a thereof leading from the auxiliary outlet chamber 312 to the electrically-controlled valve 120, and a second portion 318b leading from the electrically-controlled valve 120 and toward a secondary fuel nozzle by way of the secondary fuel circuit 319. The electrically-controlled valve 120 enables active adjustment of fuel flowing through the auxiliary fuel circuit 317, and thus also the secondary fuel circuit 319. Depending on the implementation, the electrically-controlled valve 120 can be formed integrally with a housing of the valve 300 or separately attached thereto.

In alternate implementations, the same valve arrangement 300 can be used in conjunction with multiple injectors simultaneously. That is, instead of providing a valve arrangement 300 on each of the individual injectors, it may be advantageous, depending on the implementation, to distribute the fuel from each of the primary 317, secondary 319 (and auxiliary 318) fuel channels to groups of multiple fuel injectors and their respective nozzles.

As such, the valve arrangement 300, including electrically-controlled valve 120 on the auxiliary fuel circuit 318 leading to the secondary fuel circuit 319, permits active control of fuel flow rate through the secondary fuel circuit 319, in addition to the regular fuel pressure-based flow schedule determined by the purely mechanical components of the valve 100.

Figure 4:
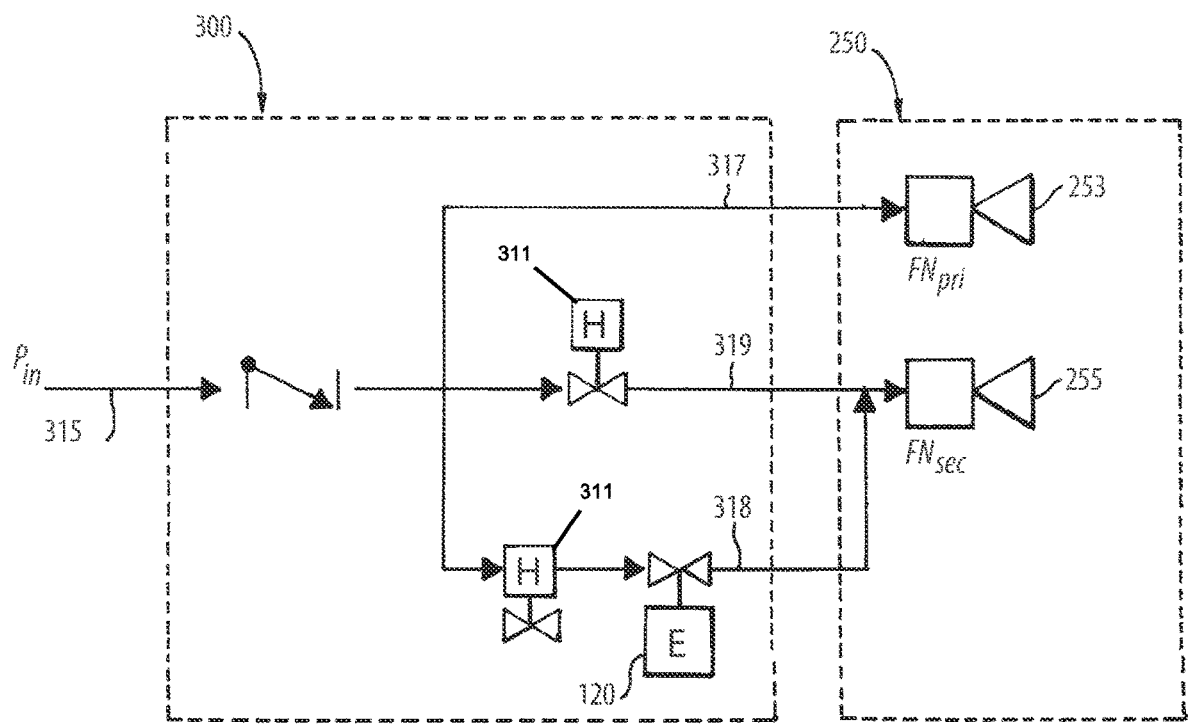
FIG. 4 is a schematic diagram of the valve arrangements of FIG. 1 & FIG. 3.

FIG. 4 is a schematic diagram of the valve arrangements both of FIG. 1 and FIG. 4, illustrating the functional arrangement of components of valve 100 and valve 300 and an associated fuel injector 250. For simplicity, the reference numbers utilized in FIG. 3 will be referenced. Illustrated is the fuel inlet 315, followed by a check function, accomplished by a first open position of the valve spool 311 of FIG. 3. After that, fuel is divided into primary 317, secondary 319 and auxiliary 318 fuel circuits. The primary fuel circuit 317 leads directly to the primary nozzle 253 of the fuel injector 250. The secondary fuel circuit 319 leads through the fuel scheduling function accomplished also by the valve spool 311, and to the secondary nozzle 255 of the fuel injector 250. The auxiliary fuel circuit 318 leads through the electrically-controlled valve 120 and to the secondary fuel circuit 319 before arriving at the secondary nozzle 255 of the fuel injector 250.

The fuel schedule for the auxiliary fuel circuit 318, as dictated by the configuration of the spool 311 can be selected as desired. That is, the fuel schedule for the auxiliary fuel circuit 318 can be largely binary, leaving any modulation or gradual control to the electrically-controlled valve 120, which then can be either binary (e.g., solenoid-type), or a more precisely controlled type of electrically-operated valve (e.g., with a stepper motor actuator). Alternatively, the fuel schedule for the auxiliary fuel circuit 318 can be gradually opening, as dictated by the shape of the spool 311, depending on the desired operational characteristics and/or system limitations.

Figure 5:
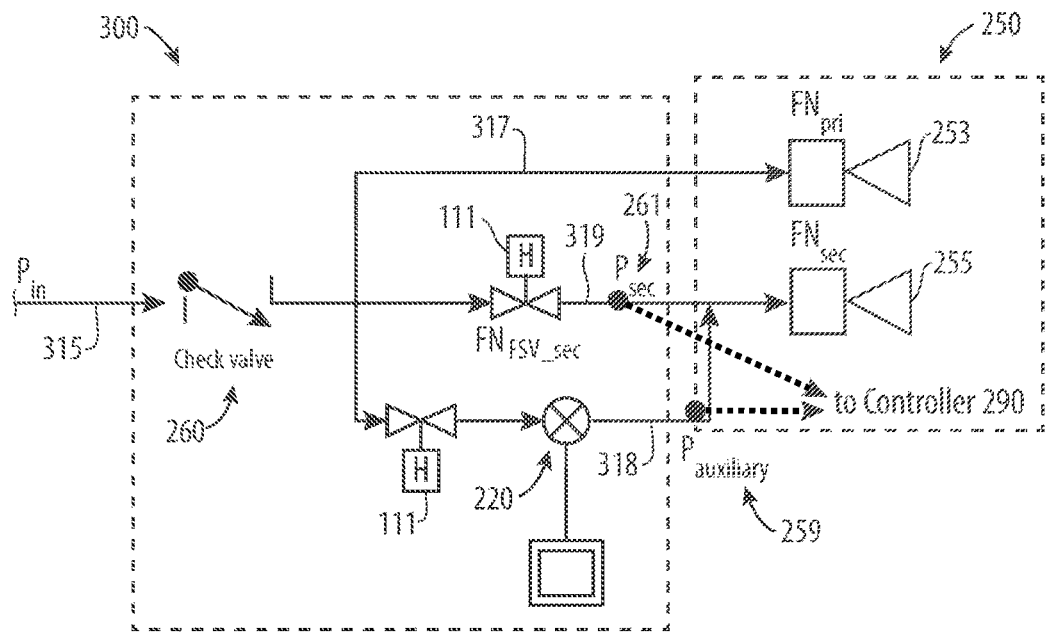
FIG. 5 is a schematic diagram of a valve arrangement of FIG. 4, showing a proportional valve in the auxiliary fuel circuit.
Figure 6:
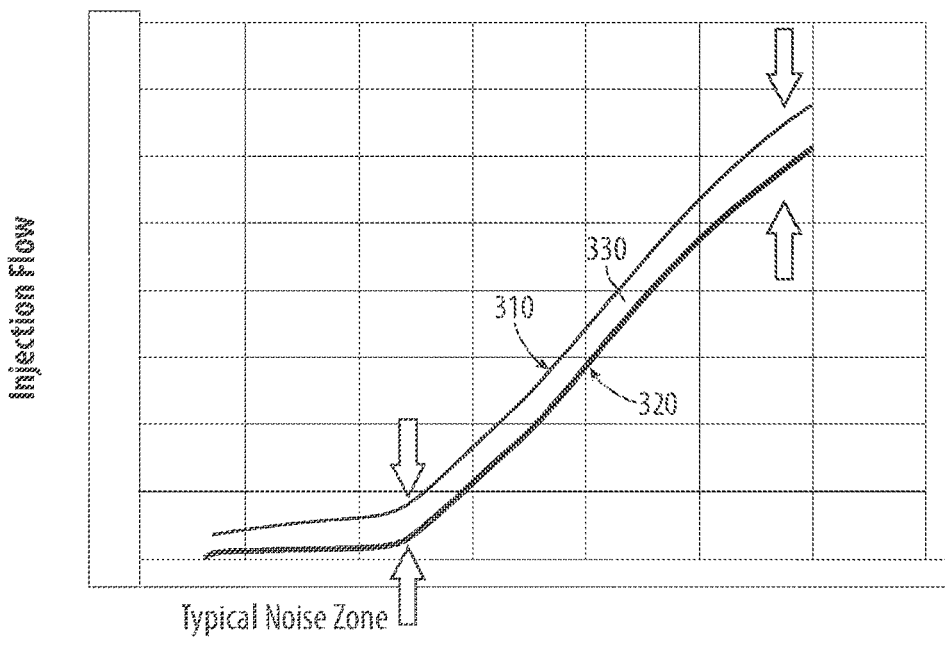
FIG. 6 is a graph of injector flow versus manifold pressure for a valve arrangement of FIG. 1, showing a first baseline, e.g. with the valve of the auxiliary fuel circuit fully closed, showing a second baseline, e.g. with the valve of the auxiliary fuel circuit fully open, and showing the area in between the first and second baselines, e.g. which is available with proportional control of a proportional valve of FIG. 5.

In FIGS. 1, 3, and 4, the electrically-controlled valve 120 is a discrete open/closed valve even if a modulating type valve is used, however with reference now to FIG. 5, it is also contemplated that it can instead be a proportional valve 220, with intermediate conditions between fully open and fully closed. The proportional valve 220 includes a proportional solenoid, a stepper motor, or a torque motor based servo valve with flapper and nozzle. If a stepper motor is used, multiple discrete steps can be used between fully open and fully closed. The check valve 260 is upstream of the branch between the primary, secondary, and auxiliary circuits 317, 318 and 319, and a hydraulic valve, i.e. incorporating the valve spool 111 of FIG. 1 is in the secondary line 319 of the valve 100 for control of flow through the secondary circuit 319. Proportionally controlling the electrically controlled valve 220 between fully opened and fully closed states allows for intermediate flow states for fine tuning as needed to combustion conditions. FIG. 6 shows a graph of injector flow rate versus manifold pressure for total flow through the injector, i.e. through the inlet 315. The first line 310 shows the flow response over a range of manifold pressures with the electrically-controlled valve 220 fully open, and the second line 320 shows the same but for the electrically-controlled valve 220 fully closed. Proportional control between fully closed and fully opened allows fine tuning of the flow at a given manifold pressure to the area between the two lines 310 and 320. The large arrows in FIG. 6 indicate the range of the typical noise zone, and the area between lines 310 and 320 extends over a considerable percentage of the typical noise zone. Proportional control within the area between the lines 310, 320, not just the on/off states of lines 310 and 320, can provide benefits including improved pull away, light around, noise mitigation, and injector to injector total flow profiling at maximum power to improve turbine life.

With continued reference to FIGS. 2 and 4, each of the injectors 250, including the passive injectors 240, can include a mass flow sensor 259 in the auxiliary line 318, and/or a mass flow sensor 261 in the secondary line 319. Each mass flow sensor 259, 261 can be embedded in contact with fuel passing through the injector 250/240 operatively connected to the controller 290 to provide mass flow feedback to the controller. The sensor signals can be used to control actuators of the electrically-controlled valves 220 to gain more/less uniformity as desired during operation. The sensors 259, 261 can include several devices in isolation or combination, such as a hot wire anemometer, a pitot tube, an ultrasonic transducer, an NIST (National Institute of Standards and Technology) type calibration orifice, a thermocouple, a pressure transducer, a turbine wheel, a Coriolis meter, a chemiluminescence sensor for sensing a signal from flame, or any other suitable type of sensor. The sensors 259, 261 can be placed as shown, or a total flow sensor can be used in any location suitable for sensing total flow through the injector, i.e. from the inlet 315.

There are various potential benefits of systems and methods as disclosed herein, as follows. With systems and methods as disclosed herein, failure of the electrically-controlled valve 120/220 results in limited flow to the primary circuit, not total loss of the primary circuit. Systems and methods as disclosed herein can allow for independent control of the primary circuit to mitigate acoustics, emissions or flame out. Multiple valves can work together as a system, e.g. if one valve is set to reduce flow, others can be opened to increase flow to compensate as the system adapts to stabilize conditions in the combustor. Incorporation of mass-flow sensor, pressure sensor(s), and/or position sensor allows for health monitoring, and for active flow control. Proportional control allows for valves to be gradually actuated to minimize potential pressure spikes within the fuel system. Tailoring flow proportionally between full state switch can improve operability of the engine, including ignition, pull away, and noise mitigations.

The methods and systems of the present disclosure, as described above and shown in the drawings, provide for adjustment of otherwise passive valves for gas turbine engines. While the devices, systems and methods of the subject disclosure have been shown and described with reference to preferred embodiments, those skilled in the art will readily appreciate that changes and/or modifications may be made thereto without departing from the scope of the subject disclosure.

What is claimed is:

1. A fuel injector for a turbine engine comprising:
   a housing comprising:
      an internal enclosure for pressurized fluid; and
      a fuel inlet formed on the housing, permitting delivery of a fuel supply to the fuel injector;
   a scheduling valve disposed within the housing and downstream of the fuel inlet, wherein the scheduling valve is configured for regulation of fuel flow from the fuel inlet in response to fuel pressure received at the fuel inlet;
   a primary fuel circuit formed in the housing, receiving fuel from the scheduling valve;
   a secondary fuel circuit formed in the housing, receiving fuel from the scheduling valve;
   an auxiliary fuel circuit formed in the housing, receiving fuel from the scheduling valve;
   wherein the scheduling valve includes a valve spool, biased to a closed position by one or more biasing members, wherein the valve spool is configured to regulate flow from the fuel inlet of the injector to each of the primary, secondary and auxiliary fuel circuits;
   an electrically-controlled valve in fluid communication with the auxiliary fuel circuit, adapted and configured to actively control fuel through the auxiliary fuel circuit in response to a control signal, and wherein the electrically-controlled valve is downstream of the scheduling valve;
   a fuel nozzle in fluid communication with and receiving fuel from the primary and secondary and auxiliary fuel circuits;
   a primary outlet formed on the nozzle, in fluid communication with the primary fuel circuit; and
   a secondary outlet formed on the nozzle, in fluid communication with the secondary fuel circuit and the auxiliary fuel circuit.

2. The fuel injector of claim 1, wherein the electrically-controlled valve is a discrete open/closed valve.

3. The fuel injector of claim 1, wherein the electrically-controlled valve is a proportional valve with intermediate conditions between fully open and fully closed.

4. The fuel injector of claim 3, wherein the proportional valve includes a proportional solenoid, a stepper motor, or a torque motor based servo valve with flapper and nozzle.

5. The fuel injector of claim 1,
   wherein the valve spool includes a scheduling surface configured to vary flow area through the secondary circuit based on position of the valve spool within the scheduling valve, and
   wherein the valve spool includes a scheduling surface configured to vary flow area
   through the auxiliary circuit based on position of the valve spool within the scheduling valve.

6. The fuel injector of claim 1, wherein the auxiliary fuel circuit branches off of the primary fuel circuit.

7. The fuel injector of claim 1, wherein the auxiliary fuel circuit is an independent fuel circuit downstream from the scheduling valve.

8. The fuel injector of claim 7, wherein activation of the electrically-controlled valve controls fuel flow rate through the auxiliary fuel circuit.

9. The fuel injector of claim 7, wherein the electrically-controlled valve is a binary valve.

10. The fuel injector of claim 7, wherein the electrically-controlled valve is a modulating valve.

11. The fuel injector of claim 7, wherein the electrically-controlled valve is a motorized valve.

12. A fuel supply system for a turbine engine, comprising:
   a single fuel manifold adapted to receive and distribute a fuel supply to a plurality of points of the turbine engine; and
   a plurality of fuel injectors distributed around a periphery of the engine, adapted and
   configured to receive fuel from the single fuel manifold, at least one of the fuel injectors having:
      a housing having an internal enclosure for pressurized fluid;
      a fuel inlet formed on the housing, permitting delivery of fuel supply from the single fuel manifold to the fuel injector;
      a scheduling valve disposed within the housing, configured for regulation of fuel flow from the fuel inlet in response to fuel pressure received at the fuel inlet;
      a primary fuel circuit formed in the housing, receiving fuel from the scheduling valve;
      a secondary fuel circuit formed in the housing, receiving fuel from the scheduling valve;
      an auxiliary fuel circuit formed in the housing, receiving fuel from the scheduling valve;
      wherein the scheduling valve comprises a valve spool, biased to a closed position by one or more biasing members, wherein the valve spool is configured to regulate flow from the fuel inlet to each of the primary, secondary and auxiliary fuel circuits;
      an electrically-controlled valve in fluid communication with the auxiliary fuel circuit adapted and configured to actively control fuel through the auxiliary fuel circuit in response to a control signal, wherein the electrically-controlled valve is downstream of the scheduling valve;
      a fuel nozzle in fluid communication with and receiving fuel from the primary, secondary and auxiliary fuel circuits;
      a primary outlet formed on the nozzle, in fluid communication with the primary fuel circuit; and
      a secondary outlet formed on the nozzle, in fluid communication with the secondary fuel circuit and the auxiliary fuel circuit.

13. The fuel supply system of claim 12, wherein the electrically-controlled valve is a discrete open/closed valve.

14. The fuel supply system of claim 12, wherein the electrically-controlled valve is a proportional valve with intermediate conditions between fully open and fully closed.

15. The fuel supply system of claim 14, wherein the proportional valve includes a proportional solenoid, a stepper motor, or a torque motor based servo valve with flapper and nozzle.

16. The fuel supply system of claim 12, further comprising:
- at least one passive fuel injector, receiving fuel from the single fuel manifold.

17. The fuel supply system of claim 16, wherein the at least one passive fuel injector includes only one nozzle.

18. The fuel supply system of claim 17, further comprising:
- a metering valve adapted and configured to receive a fuel supply from a fuel pump, and
- output the fuel to the single manifold.

19. The fuel supply system of claim 12, further comprising a controller electrically connected to the electrically-controlled valve on at least one fuel injector for individual or ganged control thereof.

20. The fuel supply system of claim 12, further comprising a controller electrically connected to the electrically-controlled valve on at least one fuel injector wherein each of the injectors in the plurality of fuel injectors includes a mass flow sensor operatively connected to the controller to provide mass flow feedback to the controller.

* * * * *